July 28, 1959   B. VONNEGUT   2,897,038
LOW ENERGY MINIATURE-SIZE RECORDER
Filed Feb. 4, 1955   3 Sheets-Sheet 1

INVENTOR.
BERNARD VONNEGUT

BY Campbell, Brumbaugh, Free + Graves his ATTORNEYS.

July 28, 1959

B. VONNEGUT 2,897,038

LOW ENERGY MINIATURE-SIZE RECORDER

Filed Feb. 4, 1955

INVENTOR.
BERNARD VONNEGUT

BY Campbell, Brumbaugh, Free + Graves
his ATTORNEYS.

United States Patent Office 2,897,038
Patented July 28, 1959

2,897,038

LOW ENERGY MINIATURE-SIZE RECORDER

Bernard Vonnegut, Scituate, Mass., assignor to Arthur D. Little, Inc., Cambridge, Mass., a corporation of Massachusetts Application February 4, 1955, Serial No. 486,069

5 Claims. (Cl. 346—123)

This invention relates generally to recording apparatus and more particularly to apparatus of this character having a recording instrument or a record driving motor means respectively characterized by energy outputs which are lower by several orders of magnitude than the corresponding energy outputs necessary in prior art recorders.

Low energy recording apparatus of the type mentioned is highly advantageous, since, for example, the apparatus in the recording of small value physical quantities may be operated directly by the quantity recorded, thus obviating the bulk, expense and other drawbacks inherent in the commonly necessary components interposed between the source of the quantity and the recording instrument itself. Also, such low energy recording apparatus is of great advantage in that it eliminates the necessity for bulky, expensive and complex arrangements for driving the recording medium during recording.

The prior art, however, has failed to develop a satisfactory low energy recording apparatus. This is so, since ordinary recording instruments require an energy output, higher by several orders of magnitude than that contemplated by the invention, in order to satisfactorily overcome the high frictional loading present in the usual recording apparatus. Moreover, it has been necessary in the prior art, in order to overcome this same frictional loading, to use energy in driving the record which is greater by several orders of magnitude than that contemplated by the invention.

It is accordingly an object of this invention to provide recording apparatus which is operable with an extremely low energy output for the recording instrument or for the record driving means or for both.

A further object of this invention is to provide recording apparatus of the above noted character capable of making recordings of drastically reduced size.

Yet another object of the invention is to provide components suitable for use with recording apparatus of the above noted character.

An additional object of the invention is to provide recording apparatus of the above noted character which is rugged, compact, inexpensive, and highly versatile in application.

These and other objects of the invention are realized in accordance with the invention by providing a recording apparatus having a recording instrument, a record member and a record driving means, the first two components being of a nature to reduce to extremely low values both the drag on the instrument from the member and the drag on the record driving means from the member. Accordingly, both the recording instrument and the record driving means may be of a low energy output type.

As another feature in accordance with the invention, means are provided in the recording apparatus to permit deflections in the recorded trace to be reduced in size to miniature dimensions. This reduction in size of the trace deflections further reduces the output energy required of the recording instrument and the record driving means.

As other features of the invention there are provided: a stylus arm means permitting a stylus to contact the record member under very low pressure, record members with recording surfaces producing only a minimal drag on the stylus, and a spatial organization of the recording apparatus components permiting the record of the apparatus to be replaced with a minimum of disturbance of the stylus.

The invention may be understood from the following detailed description of representative embodiments thereof, taken in conjunction with the accompanying drawings, in which.

Figures 1, 5:
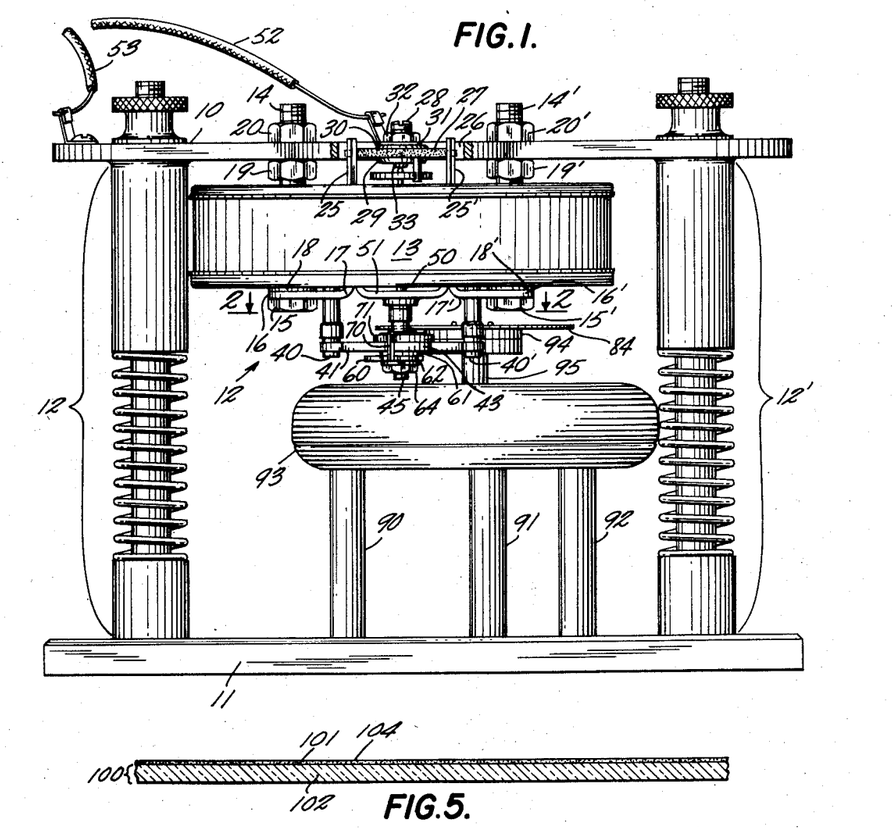
Figure 1 is a side elevation of a recording apparatus in accordance with the invention.
Figures 5, 6 and 7 are cross sectional views, broken away at the ends, of the internal structure, of several record members suitable for use with the apparatus of Figure 1.

Referring now to Figure 1, a mounting plate 10 is supported in spaced relation over a base 11 by a pair of shock mountings 12, 12'. The mounting plate 10 supports, in suspended relation therefrom, a recording instrument 12 which in the present embodiment takes the form of a microammeter movement, but which within the purview of the invention may be another kind of means sensitive to electrical quantities, or may be a means sensitive to physical quantities other than those of an electrical nature, as, say, a bimetallic element or an accelerometer. Recording instrument 12 includes a sensing unit 13 representing the complete component of the instrument necessary to sense physical quantities.

The instrument 12 receives its support from plate 10 by way of a pair of threaded bolts 14, 14' having heads 15, 15' in downward position. Bolt 14 in order to so support instrument 13, extends from its head 15 upward through the following elements: the horizontal angle arm 16 of a right angle bracket 17, a washer 18, the interior of sensing unit 13 in threaded relation with portions (not shown) of this interior, a locking nut 19, a hole (not shown) in plate 10, and a locking nut 20. Bolt 15' likewise supports sensing unit 13 from plate 10 by extending from its head 15' upwards through the following elements: horizontal angle arm 16' of right angle bracket 17', washer 18', the sensing unit 13, a locking nut 19', plate 10, and locking nut 20'. When bolts 15, 15' are drawn up tightly towards sensing unit 13, and the locking nuts associated with these bolts drawn tight against plate 10, the brackets 17, 17' are securely affixed with respect to sensing unit 13, and the sensing unit 13 is securely affixed with respect to plate 10.

Brackets 17, 17' extend upward from their affixed horizontal angle arms 16, 16' by way of respective vertical angle arms 25, 25' which pass both through the interior of sensing unit 13 and through a central circular aperture 26 formed in the plate 10. Within this aperture 26 the upper ends of the angle arms 25, 25' support therebetween an insulating block 27. The block 27, in turn, centrally supports a jeweled bearing mounting in the form of a threaded post 28 having a downwardly positioned, flanged head 29 and extending upward from this head through an aperture (not shown) in block 27, a washer 30, an electrical lead terminal 31 and a locking nut 32 screwed down to securely affix the bearing mounting with block 27. The bearing supported by this bearing mounting takes the form of a jeweled bearing 33 affixed to the underside of flanged head 29.

Figure 2:
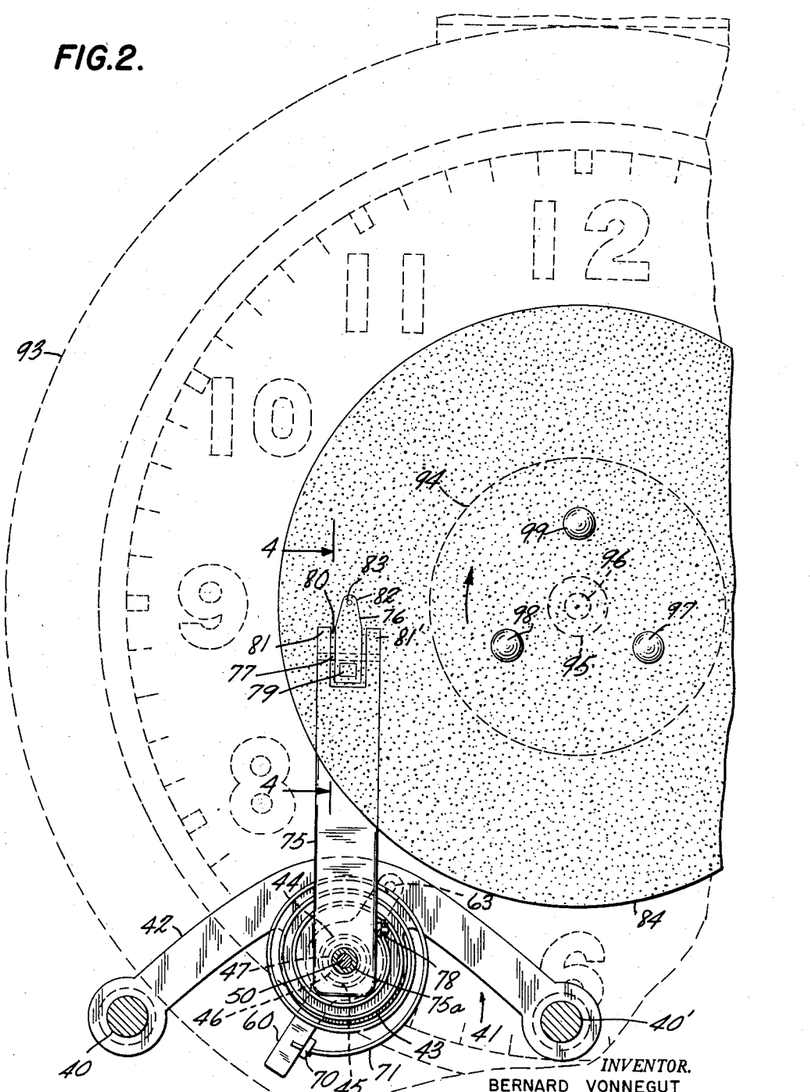
Figure 2 is a plan view of the apparatus, partially in cross section, taken as indicated by the arrows 2—2 in Figure 1.

On the lower side of sensing unit 13, a pair of posts 40, 40' extend downward from the sensing unit to support a bridging bracket 41 between the lower ends thereof. The bridging bracket (Figure 2) takes the form of (1) an arcuate strip 42 with a curvature inward towards sensing unit 13, and, (2), a rounded tab 43 extending outward from the center of strip 42. Tab 43 has formed therein (Figure 2) a circular aperture 44 with internal threads into which is secured a threaded post 45 (Figures 1 and 2) extending downwards from the aperture and representing a part of a second bearing mounting. As seen in Figure 2, the upper part of post 45 has a central hollow 46 at the bottom of which is secured a jeweled bearing 47.

The jeweled bearing 33 (Figure 1) above sensitive unit 13 and the jeweled bearing 47 (Figure 2) below this same unit furnish bearings of minimum friction for angular rotation of the sensitive element incorporated in the sensing unit 13. This sensitive element takes the form of a spindle 50 journaled at its ends by the jeweled bearings, and a current coil 51 mounted on the spindle in fixed relation therewith. Current representing a physical quantity to be recorded is furnished by the leads 52 and 53 shown at the upper left hand corner of Figure 1, the coil 51 being connected in a conventional manner, not described herein, in a path for current flow between the leads.

As is well known, when coil 51 is energized by current, the coil reacts with magnetic pole pieces (not shown) in the interior of sensing unit 13 to produce a torque tending to cause an angular deflection of the sensitive element comprised of the coil 51 and the spindle 50. The amount of torque so produced may, within the purview of the invention, vary in value from zero dyne/cm. to 50 dyne/cm. at the most, the value of the torque generated being in accordance with the value of the physical quantity represented by the current.

As is also well known, in order for the sensitive element to undergo an amount of angular deflection according to the value of the physical quantity sensed, the torque generated by the sensitive element must be opposed by a force which increases with increasing angular deflection of the element. To provide an opposing torque of such nature, the presently described embodiment includes an adjusting arm 60 (Figure 2) mounted for rotation on the post 45 (Figure 1) in sandwiched relation between a pair of washers 61, 62. This adjusting lever 60 at its inward end carries an upstanding detent 63 (Figure 2) adapted to frictionally engage the underside of the arcuate strip portion 42 of bridging bracket 41. Thus by moving the outer end of lever 60 manually, the lever may be rotated about post 45 to a desired setting and then locked to this setting by drawing up a locking nut 64 (Figure 1) on post 45 so that the locking nut by its upward movement causes the detent 63 to press firmly against the underside of the arcuate strip 42.

The outer end of adjusting lever 60 is connected by a vertical link 70 with the outer end of a helical restoring spring 71 encircling the spindle 50 above the bridging bracket 41. The spindle 50 carries above spring 71 a stylus arm means consisting of a stem arm 75, a rocker arm 76 and a torsion fiber 77, these elements being later described in greater detail. For the present it suffices that the shank of the stem arm 75 is attached to spindle 50 by appropriate means as, say, by a hub 75a integral with the stem arm and press fitted on the spindle so that the stem arm follows the angular deflections thereof. As stem arm 75 moves in angular deflection, the movement thereof is communicated to the inner end of restoring spring 71 by a short vertical link 78 (Figure 2) extending downward of the stem arm 75 from a point thereon spaced away from the spindle 50.

It will thus be seen, as stem arm 75 moves clockwise (Figure 2) in angular deflection responsive to torque exerted by the spindle 50, the spring 71 will be partially uncoiled in compression to oppose the spindle torque with an opposie torque increasing with deflection of the spindle. Hence the stem arm 75 will undergo an angular deflection from zero position in accordance with the value sensed by the sensitive element of which the spindle 50 is a part.

In this regard, the zero angular position for the stem arm is that position wherein the restoring spring 71 is under zero compression. Since this zero compression condition exists only for one value of the angular displacement between stem arm 75 and adjustment lever 60, a shifting in the rotary setting of lever 60 results in a corresponding angular shift in the zero position for the stem arm.

Considering now the details of the aforementioned stylus arm means, the stem arm 75 is in the form of a thin strip of sheet metal or the like, the strip being oriented so that its breadth dimension lies in the direction of angular deflection taken by the stem arm. At the head thereof the stem arm 75 is bifurcated to accommodate the rocker arm 76 within the gap 80 formed between the forks 81 and 81' of the bifurcation. Rocker arm 76 is pivoted, at a portion thereof within the gap, by the torsion fiber 77. Torsion fiber 77 is attached by its ends to the upper sides of the forks 81, 81' and which extends across the gap 80 underneath the rocker arm 76. Preferably torsion fiber 77 is attached to rocker arm 76 along the center of gravity of the combined stylus, rocker arm and an optioned counterweight 79 on the rocker arm.

The rocker arm 76 is, like stem arm 75, in the form of a flat strip of sheet metal or the like, the strip being oriented so that its breadth dimension lies in the direction of angular deflection. When attached, as described with torsion fiber 77, the rocker arm for a zero twist condition of the fiber rests with the outer end 82 of the rocker arm tilted slightly upward. This outer end 82 supports an upstanding stylus 83 which may be, for example, a 0.001 inch diameter tungsten wire etched with sodium nitrate to a needle tip at the free end thereof. As described more fully hereafter the needle tip stylus 83 is adapted to inscribe a record trace in the underside of a record member such as the record member 84 shown in Figures 2 and 4.

The above described construction of the stylus arm means is characterized by a number of advantages. For example, both the stem arm 75 and rocker arm 76 are, within the purview of the invention, each limited to a weight of 1 gram or less. Hence, the coupling between stylus 83 and spindle 50 provided by these arms loads the sensitive element with a minimum mass and a moment of inertia to thus minimize the bearing friction of the element and to maximize the frequency of response thereof. Also, by virtue of the fact that the breadth dimensions of the stem arm and rocker arm lie in the angular deflection direction, the linkage formed of these two arms is characterized by rigidity as is desirable, in the direction taken by the angular deflection while being resilient, as is also desirable, in the direction normal to angular deflection.

Further since rocker arm 76 is pivoted by torsion fiber 77 at the gravity center of the rocker arm, the stylus 83 will have a substantially constant pressure contact with record member 84 despite any orientation of the apparatus relative to the direction of gravity, or despite sharp accelerations of the recording apparatus in any direction. Additionally, as described hereafter in greater detail the linkage of the stem arm and rocker arm is adapted to maintain stylus 83 in reliable contact with record member 84 under a contact pressure which is less by several orders of magnitude than that afforded by an ordinary stylus-sensitive element linkage constructed, as is necessary, to be rugged enough to withstand, a deflection in the direction normal to the angular movement without permanent deformation. For the purpose of obtaining this extremely low contact pressure, the twist characteristic of the torsion fiber is mutually proportioned with the spacing thereof from the stylus 83 so that downward deflection of the stylus is accompanied by an upwardly directed resilient torque having a linear resiliency coefficient of 1 dyne/mm. at the most as seen at the stylus. In order to provide a resiliency coefficient somewhere within this range, the spacing between the stylus and fiber may be on the order of 20 mm., and the torsion fiber 77 may be a metal wire of, say, tungsten having a diameter of 0.001 inch at the most and a twistable length from side to side of the gap 80 of about 1 centimeter.

The description hitherto of the recording apparatus has been confined to the recording instrument component which may be considered as comprised of the described needle tip stylus, a sensing means having a sensitive element, and a stylus arm means coupling the stylus to the sensitive element to provide for angular deflection of the former according to the value of a physical quantity sensed by the latter. The sensing means itself may be considered to be comprised of the sensitive element and a means affording a resilience force which opposes deflection of the element in accordance with the amount of angular deflection thereof.

Continuing now with the remainder of the recording apparatus, the base 11 (Figure 1) supports in raised relation thereabove, by way of the upstanding posts 90, 91, 92, a motor means for moving the record member 84 during recording. In the present embodiment this motor means takes the form of a conventional spring driven pocket watch 93 (Figure 3) operative by an escapement movement (not shown). The hands of the watch have been removed and a record member mounting means in the form of a small turntable 94 (Figures 1 and 3) has been fitted by a downwardly depending hub 95 thereof (Figure 1) onto the hour hand shaft 96 (Figure 3) of the watch 93. Thus the running of watch 93 rotates turntable 94 one revolution in every twelve hours.

The record member 84 may be adapted in shape to the circumstances of application. Thus it may be a record plate of rectangular form similar to the glass slides used in a microscope stage. As shown in Figure 2 it takes the form of a disk of 5 cm. diameter at the most mounted on turntable 94 in centered relation therewith by three set screws 97, 98, 99 which pass from enlarged heads thereof down through bored holes (not shown) in the record plate and into threaded holes (also not shown) in the turntable. Alternatively, the record plate may be secured to turntable 94 by adhesive.

Figure 4:
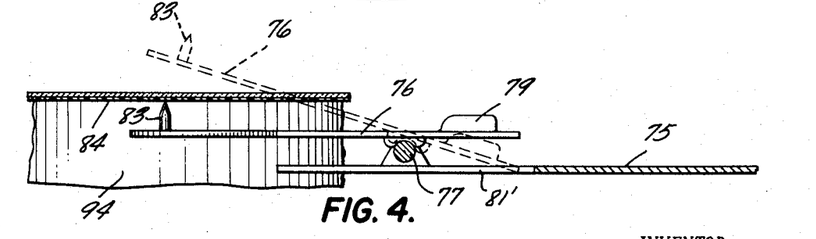
Figure 4 is a side elevation, taken as indicated by the arrows 4—4 in Figure 2, showing details of the stylus and stylus arm means for the apparatus of Figure 1.

It will be noted (Figure 2) that stylus 83 extends upward from rocker arm 76 whereas the record motor means (or watch) 93 lie downward of this rocker arm. Hence contrary to the usual arrangement in recording apparatus, the stylus and the motor means for the record are disposed on opposite sides of the means coupling the stylus with the sensitive element. Moreover, as best shown in Figure 4, both the turntable 94 and the stylus 83 extend upwardly, but the position of the record mounting surface falls short in the upward direction of the stylus tip when, as shown in dotted outline, the stylus is not in contact with a record plate so that the rocker arm 75 rests in undeflected position. When a record plate 84 is brought downward into mounting position on the turntable 94, there results a downward deflection of rocker arm 75 to create torque in fiber 77. In so deflecting rocker arm 75 the record plate moves the stylus only by the amount necessary to generate the proper stylus-record plate contact pressure. Hence the spatial relations between the record mounting means, the stylus, and the means supporting the stylus stand in contrast to the usual arrangement wherein the record is inserted between the stylus and record driving means and wherein, accordingly, the stylus and support means associated therewith must be deflected considerably beyond normal recording position in order to make room for insertion of the record. This minimization during replacement of a record, of the deflection of the stylus and associated support means, is of great advantage in recording apparatus wherein the stylus support means is necessarily of light structure and hence may be permanently deformed by undue bending thereof.

Figure 6:
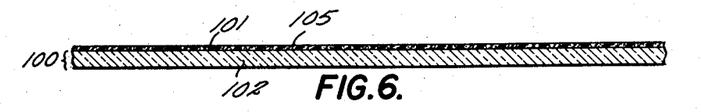
Figure 7:
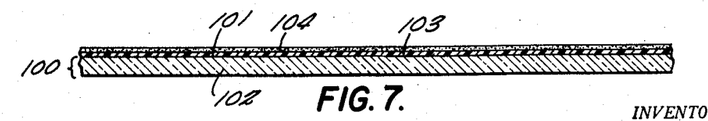

To provide for generation of a trace on record plate 84 under the low friction force conditions hereafter described, the mentioned record plate has a characteristic general structure of which several forms are shown in Figures 5, 6 and 7. In each of these figures the record plate has, as one component, a dimensionally stable underbody 100 of discoid shape, the underbody having a surface 101 characterized by a smooth finish. Thus, in Figures 5 and 6 the underbody may be a glass base member 102 having a vitreous finish surface 101. In Figure 7, the underbody 100 may consist of a glass base member 102 overlaid by a layer 103 of an organic plastic material which is normally hard but which is softenable with appropriate treatment. Layer 103 in Figure 7 may be composed of nitrocellulose, a normally hard plastic material which softens when exposed for a time to acetone vapor. Other normally hard plastic materials softenable with appropriate treatment may be used, as, say, a material which is normally hard at room temperature but which softens under elevated temperature. Whatever the material used, in Figure 7, the smooth finish surface 101 is represented by the outer surface of the plastic layer 103.

In addition to the underbody 100, in each of Figures 5, 6 and 7 the record plate 84 has another component in the form of a layer of record sustaining material adhering to the smooth finish surface 101. Further, in each of the figures, this record sustaining layer is a shear-compliant layer, the term "shear-compliant" being used to indicate (1) that the layer opposes with negligible mechanical strength the shearing action of a stylus inscribing a trace therein, and (2) that the layer is mechanically weak beyond the point where it is able to guide a stylus in a trace formed therein. The shear compliance property of the record sustaining layer is in part given thereto by the material of which the layer is composed. According to the present invention the layer material is incohesive in nature compared with, say, metallic materials such as silver or the plastic materials used in ordinary phonograph records. The composition of the material, may differ, however. Thus in Figures 5 and 7 preferably the record sustaining layer, takes the form of an extremely thin film 104 of finely divided carbon particles (lamp black) which are deposited by aerosol deposit to adhere loosely on the surface 101. However, the film 104 may also be composed of other materials in finely divided particulate form, as, say, a film 104 composed of finely divided particles of zinc or magnesium oxide. On the other hand, in Fig. 6, the record sustaining layer takes the form of a coating 105 of a ceraceous material as, say, paraffin, deposited on the smooth finish surface 101.

Figure 3:
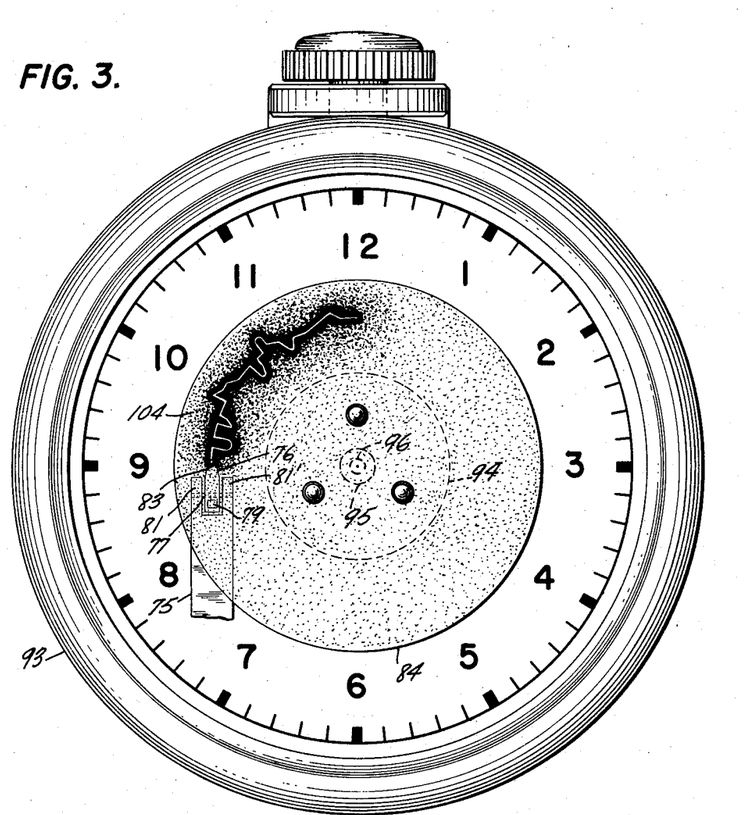
Figure 3 is a plan view showing details of the record member and record driving means characterizing the apparatus of Figure 1.

The record plates of the present invention are adapted to provide a record trace which, as shown in Fig. 3, optically stands out in sharp contrast to the background. This sharp contrast effect is obtained in the record plates of Figs. 5 and 7 by transillumination, and for this purpose the underbody 100 in these record plates is transparent while the film 104 is at least partially opaque by virtue of being comprised of particles which are opaque in appearance because of light absorption or light scattering or another optical phenomenon causing opaqueness. In the record plate of Fig. 6 either transillumination may be used, if the coating 105 is sufficiently opaque, or side illumination may be used if this coating is substantially transparent. Of course, if side illumination is used the underbody 100 in Fig. 6 need not be transparent.

As other alternatives to obtain sharp optical contrast the surface of the underbody may be a polished reflecting surface or may otherwise be a surface providing a high contrast with the record sustaining layer, as, say, a white underbody surface contrasting with a black recording layer.

Enlarging upon the characteristics of the film 104, within the purview of the invention the particles within the film are of one micron size at the most and are distributed over the surface 101 in a dispersion of single particle thickness. Also in film 104, the component particles thereof are present therein in sufficiently sparse dispersion that when, as in the present embodiment, opaque particles are used, the film 104 within the contemplation of the invention passes 50% at the least of the light transmitted through the transparent underbody 100. Because of the extreme thinness of the film and the scantiness of particles therein, the film 104, as later more fully described, presents a very low mechanical resistance to movement of a stylus therethrough.

Since the particles of film 104 are in loosely adhering relation with the surface 101, there is a tendency with improper handling of the record plate 84 for the mentioned film to become smudged so that the record thereon is marred. This problem may be adequately coped with by the form of record plate shown in Figure 7. After a record trace has been inscribed by a stylus in film 104, this record plate is treated to soften the underlying layer 103 of plastic material. For example, if, as mentioned, the layer 103 is composed of nitrocellulose, this layer may be softened by exposing the record plate to acetone vapor. When layer 103 is so softened, the finally divided particles in the film 104 sink into the surface 101 to become imbedded in the plastic material. Thereafter the plastic in 103 is permitted to reharden with the result that the record trace in film 104 is permanently fixed on the record plate.

As mentioned, preferably the underbody 100 is composed of transparent material while the film 104 is composed of opaque material. Accordingly, although the stylus 83 inscribes in film 104 a record trace of extreme fineness, as, say, ten microns width at the most, the record trace is, optically, very pronounced. Thus, the presently described record plates may be used in place of micro film to preserve record traces in a form subject to ready reproduction and/or enlargement by photographic or other optical means.

It will be appreciated that the record plates provided for in accordance with the present invention are characterized by a number of advantages not present in ordinary recording mediums. For example, the presently described record plates are light in weight, have a minimal area, to give ease in storage and handling, and are dimensionally stable with resulting freedom from damage by creasing or the like. Another extremely important advantage of the presently described record plates will be brought out in the discussion to follow.

Having described the structural elements of a recording apparatus according to the present invention, it is now necessary to consider the aspects of these structural elements which make possible the operation of the recorder with a sensitive element and with a record driving motor means, both of which components having an extremely low energy output. As a simplified explanation of the principles involved in the presently described recording apparatus, the forces involved are given by the expression:

$$f = kd \quad (1)$$

where, in linear terms, $f$, for any stylus displacement from zero towards full scale, is the linear deflection force exerted on the stylus by the sensitive element, $d$ is the value of the concurrent stylus displacement from zero position, and $k$ is the restoring coefficient of the resilience force opposing increased stylus displacement. The energy expression of interest is, in linear terms:

$$W = \tfrac{1}{2} FD \quad (2)$$

where $W$ is the total work done by the sensitive element against the opposing resilience force in moving the stylus from zero to full scale displacement and $F$ and $D$ are the full scale values of $f$ and $d$. In angular terms Expression 2 becomes:

$$W = \tfrac{1}{2} TA \quad (3)$$

where $T$ is the deflecting torque exerted by the sensitive element at full scale angular deflection thereof, and $A$ is the amount of angular deflection undergone by the stylus and sensitive element from zero to full scale deflection.

From Expression 2 it is clear that reduction of either of the quantities $F$ or $D$ will permit the work capacity required of the sensitive element to be reduced. In other words by reducing one or both of these quantities by several orders of magnitude below the usual employed value, it is possible to use a sensitive element of such low energy output capacity that it differs in kind from the various stylus deflecting means hitherto employed in recording apparatus.

Considering reduction of $F$, the recording instrument, for any position in its displacement range, experiences a loading or drag force $f_1$ opposing the deflecting force $f$. This loading force $f_1$ is substantially constant over the whole displacement range, will be highest when the stylus is static, and, in general, represents the sum of the frictional drag $f_b$, of the bearings, and the drag $f_s$, of the recording surface on the stylus. The jeweled bearings heretofore described provide a satisfactorily low value of $f_b$ for the present invention, and it is accordingly not within the contemplation thereof to take measures unrelated to the drag $f_s$ for further reduction of $f_b$. Hence, for simplicity, unless otherwise mentioned it is assumed hereafter that $f_s$ represents the entire drag force on the recording instrument.

In order to overcome the drag force $f_s$ on the stylus when it is static at a given displacement position $d'$ therefor, the deflecting force must increase from the theoretically proper value $f'$ for the deflecting force at $d'$ by an increment $\delta f$ which more than equals $f_s$. It follows, although the deflecting force increases by as much as $\delta f$, that the stylus does not move to its theoretically correct displacement position for the force value $f' + \delta f$, but instead remains static at $d'$ to indicate an apparent force of $f'$. A discrepancy so arising between the theoretically correct and actual positions of the stylus represents a displacement error, $\delta d$ which in absolute distance units has a value given by the expression:

$$f_s = K \delta d \quad (4)$$

In recording, however, in order to get a significant figure for the accuracy of recording, it is necessary to relate the absolute error in displacement to the entire displacement in which the error exists. One such figure which is representative of overall recording performance is the relative error at full scale displacement, this relative error being designated by the term $m$, having a value given by the ratio expressions:

$$m = \frac{\delta d}{D} = \frac{K \delta d}{KD} = \frac{f_s}{F}$$

$$(5) \quad (6) \quad (7)$$

The value of $m$ is usually fixed by design considerations. For example, the relative error at full scale may be required for certain applications to be no more than 1% in percentage terms. With $m$ so fixed it is seen from Expression 7 that, to attain the objective of drastically reducing $F$ in order to correspondingly reduce the energy output required of the sensitive element, it is first necessary that the stylus drag force $f_s$ be drastically reduced.

To the end of so reducing $f_s$, it is clear that it is desirable to make more shear compliant, the material in which the stylus inscribes its trace. If such material is extremely shear compliant, however, it has no mechanical strength of its own so that it is unable to hold its shape. This problem is met according to the present invention by providing, as a part of the record member, the mentioned dimensionally stable underbody, which in addition to supporting the shear compliant layer has a number of hitherto mentioned advantages as well.

As another consideration pertinent to the reduction of $f_s$, it has previously been thought desirable, in order to get a better trace, that a relatively thick layer of record sustaining material be used. With such thick layer, the stylus contact pressure must be high enough to prevent "skipping" of the stylus as a result of being "wedged-up" by the layer during recording. Moreover, with this thick layer and with a contact pressure of a value selected to prevent skipping while at the same time not being unnecessarily heavy on the record, the drag force $f_s$ has been largely independent of the contact pressure but has been relatively high. This high value for $f_s$ can be attributed to the fact that the drag on the stylus is caused primarily by the force necessary to cut through the thick layer rather than by the much lesser frictional force exerted by the smooth finish surface of the underbody on the stylus as the stylus moves over this surface.

It has been discovered, according to the present invention, that the thickness of the record sustaining layer can be drastically reduced while, nevertheless, a satisfactory trace is still obtained. It has also been discovered as an inobvious phenomenon that when the layer is reduced in thickness below a critical value, which in turn is no less than the layer thickness contemplated by the present invention, the stylus drag force $f_s$ becomes substantially independent of layer thickness and, instead, is determined almost exclusively by the coefficient of friction between the stylus and the smooth finish surface of the underbody. As a result of this feature of having the underbody surface rather than the record sustaining layer determine the frictional drag on the stylus, the force $f_s$ for a given contact pressure may be greatly reduced over that obtaining with ordinary recording conditions since the friction drag occasioned substantially entirely by the underbody surface is much less than the drag occasioned substantially entirely by a thick layer having a trace inscribed therein. Of course, however, with the underbody surface causing substantially all of whatever stylus drag there is, the drag force $f_s$, being primarily a friction phenomenon, will vary with the contact pressure.

The described reduction in layer thickness below critical value has a two-fold advantage in that, not only, as described, is the drag of the layer reduced to negligible value, but in addition, the stylus contact pressure may be greatly reduced in value while still being productive of a satisfactory trace. This fact is so, since the layer when so reduced has little tendency to "wedge-up" the stylus to cause it to skip over the record. Hence no extra contact pressure is needed to overcome this wedging tendency, and the pressure may be reduced to that minimal amount necessary to assure no more than a reliable contact between the stylus and the underbody surface.

When the contact pressure is so reduced, the stylus drag force $f_s$, being equal to the product of the contact pressure and a friction coefficient, is correspondingly reduced. Moreover, with regard to this relation by a friction coefficient of $f_s$ to the contact pressure, it has been discovered as an unexpected phenomenon, that for very low contact pressures, as, say, less than 0.2 dyne, the friction coefficient itself decreases to further supplement the decrease in the stylus drag force as the contact pressure decreases.

As an additional discovery of significance, it has been found that when the surface 101 of the underbody is the surface of the plastic layer 103 of Figure 7, the force $f_s$ is reduced to less than one-third of that present when the surface 101 is the glass surface of Figures 5 or 6.

In connection with the considerations discussed above for reducing $f_s$, the following table sets forth experimental results obtained with different record sustaining surfaces in contact, under a pressure from 0.1 to about 1 dyne with a needle tip stylus leaving a trace of 10 micron width at the most upon the surface.

| Surface: | Static friction coefficient |
|---|---|
| Clean glass | 1.0 |
| Lightly coated glass | 1.5 |
| Medium coated glass | 2.0 |
| Nitrocellulose covered glass | .31 |
| Nitrocellulose covered glass lightly coated | 1.1 |

From the foregoing it will be seen that by use of a record member having a shear compliant layer of very low thickness on a dimensionally stable underbody, and by the further use of means giving a very low contact pressure of the stylus with the record, the drag force $f_s$ may be reduced by several orders of magnitude from that value common to conventional recorders. As to specific values, within the contemplation of the invention, the record sustaining layer and the underbody surface of the record member have, respectively, a sufficiently low shear compliance-thickness characteristic and a sufficiently low friction characteristic that the record member has a static mechanical resistance of one dyne at the most to a needle tip stylus in contact with the record member under 0.1 dyne pressure and leaving a trace therein of 10 microns' width at the most. Also, as an independent specific value, within the contemplation of the invention the stylus contact pressure is of one dyne value at the most. It will be realized that a contact pressure of this minimal value is made possible by the construction of the stylus arm means described above.

It should be kept in mind that the foregoing discussion has been concerned with static conditions, and that, when the stylus is moving, the drag force $f_s$ thereon is substantially reduced, probably to less than ½ of the static force.

With $f_s$ so reduced in magnitude it is seen from Expression 7 where the ratio $f_s/F$ is equated to the quantity $m$, assumed fixed in value, that the maximum stylus deflecting force F may be correspondingly reduced. It follows from Expression 2 that the present invention permits use of a recording instrument with very low energy output capacity.

As one more note of interest, since the stylus contact pressure is so low the thrust upon the bearings for the sensitive element is minimized. Accordingly, the low contact pressure not only reduces the $f_s$ component of the total loading force $f_1$ on the sensitive element, but also reduces the component $f_b$ as well.

So far the discussion has been confined to reduction of the loading force on the recording instrument. It will be seen however, that the force $f_s$ also represents a load upon the record member drive means. Hence by drastically reducing $f_s$ as described, it is possible to use a very low energy driving means as, say, the pocket watch 93 for the presently disclosed embodiment of the invention.

In connection with Expression 2 it was stated that the energy output capacity required of the sensitive element could be reduced either by reducing F or by reducing D. Considering now reduction of the sensitive element energy output by way of reducing D, this reduction will not affect the value of either the stylus drag force $f_s$ or the full scale deflection force F. Hence, it will be seen, by comparison of the ratios (5) and (7), that reduction of D has no effect upon the recording error arising from friction loading, since as D decreases the value $\delta d$ (representing absolute displacement error from friction) decreases proportionately. In fact, the value D may be reduced until the proportionately decreasing value $\delta d$ becomes of the same order of size as the width of the trace left by the needle tip stylus. At this point in the reduction the error arising from difficulty in accurately reading the trace approaches and may exceed the mechanical error arising from friction. Hence, there is no advantage in further reducing D.

With regard to the mode of reducing D, in Expressions 6 and 7 the numerator of ratio (6) equals the numerator of ratio (7), and the denominator of ratio (6) equals the denominator of ratio (7). Hence it will be seen, with an assumed constant value for F, that the value D bears an inverse relation to the value of K, the restoring coefficient, and that D will be decreased by increasing K. When K is so increased to decrease D, from Expression 2 the output energy required of the sensitive element will be decreased. Thus, there is established the rather surprising result that by increasing the stiffness of the restoring means by, say, a tenfold factor, the output energy required of the sensitive element is decreased to one tenth of that necessary heretofore.

In the presently disclosed embodiment, the resilient restoring force, used in conjunction with the presently disclosed sensitive element, has a restoring coefficient larger by at least one order of magnitude than that conventionally used with sensitive elements of comparable full scale torque output. This large size value for the restoring coefficient K may be expressed either in terms of force per unit distance when stylus movement is considered in linear terms or as torque per unit radian when the stylus movement is considered in angular terms. In the present instance, the resilient restoring force with large value K is provided by the hitherto mentioned over-size restoring spring 71 (Figure 2).

In its effect the over-size restoring spring 71 is of sufficient stiffness to reduce, as described, the energy output requirement for the sensitive element to 0.1 erg at the most when, as contemplated by the invention, the sensitive element exerts a torque of 50 dyne/cm. at the most at full scale deflection. Thus, the use of an unusually stiff restoring spring acts as another factor permitting an extremely low energy output sensitive element to be satisfactorily used in the described recording apparatus.

As another advantage, the over-size restoring spring increases the resonant frequency of the restoring instrument so that the same will respond well at frequencies much higher than those for which it is ordinarily adapted.

The over-size restoring spring, in addition, provides certain advantages associated with the record member and the driving means therefor. For example, within the contemplation of the invention, the radial distance of the stylus from the sensitive element and the value of the restoring coefficent K are mutually proportioned to limit to 5 millimeters at the most the linear distance traveled by the stylus from zero to maximum angular deflection thereof. Since the greatest swing of the stylus is thus limited to 5 millimeters, in recording of the sort presently described wherein the record plate is rotated about its axis, the stylus can be placed with its zero deflection position much closer to the rotation axis than would be the case for greater stylus swings. Such closer placement of the stylus gives the result that the torque exerted by the stylus about the axis and opposing record rotation will be commensurately reduced. Hence, the limiting of the stylus swing to 5 millimeters at the most is another factor permitting low output energy means as, say, a pocket watch, to be used to rotate the record.

Another advantage in the use of the presently described over-size restoring spring inheres in the fact that, when the sensitive element undergoes angular deflection to indicate a sensed quantity, the restoring spring limits to a very small angular value the amount of angular deflection which occurs from zero to full scale. For example, within the contemplation of the present invention, the value K of the restoring coefficient and the radial distance of the stylus from the sensitive element are mutually proportioned so that for a sensitive element of 50 dyne/cm. full scale torque, the full scale angular deflection of the stylus is 0.1 radian at the most. Such small full scale angular deflection value renders negligible the error arising from the fact that the stylus moves in an arc over the record member rather than radially of the rotation axis thereof, so that, at a given time instant, the time reading of the trace, by radial projection from the axis appears to have different values for zero and full scale stylus positions. Thus, the effect of the over-size restoring spring in limiting full scale deflection to a very small angular value provides a distinct advantage in obtaining accurate recording compared with situations where, say, the full scale angular deflection of the stylus is one radian or more.

It will be appreciated that the above described recording apparatus is of great versatility of application. For example, because of its compactness and freedom from adverse effect by gravity or acceleration, the recording apparatus may be advantageously used in experimental rockets in place of telemetering equipment. As a result of its low energy requirements, the apparatus may be operated from a flashlight battery source for a period of as long as six months. Thus, when the record driving means is also operated from the flashlight battery source, the apparatus may be used for long periods without attention to record events occurring at geographically isolated recording stations. Moreover, since the recording apparatus may be in the form of a combination of very low cost components, the apparatus may be used as an expendable unit which is placed, say, in packing crates to record conditions in the crate during a journey, the apparatus being discarded at the end of the journey.

The described embodiment being illustrative only, it will be appreciated that the present invention comprehends organizations differing in form or detail from the presently described embodiment. Accordingly the invention is not to be considered as limited save as is consonant with the scope of the following claims.

I claim:

1. A recording instrument comprising in combination, a low energy sensitive element movable in angular deflection and generative or torque causing said deflection and varying in valve from 0 dyne/cm. to 50 dyne/cm. at the most, said torque being generated in accordance with the value of a physical quantity sensed by said element and said torque having a value T at full scale deflection, an inscribing stylus having a wear-resistant needle tip adapted to inscribe a trace of width $w$ of the deflections of said sensitive element in a record sustaining layer comprised of a thin incohesive deposit of fine particles adhering loosely to the smooth surface of a supporting underbody and susceptible to dislodgment from said surface by said stylus to thereby form said trace, said layer and underbody together comprising a record member, stylus arm means coupling said sensitive element and stylus to provide for linked angular deflections thereof, resilient means coupled to said stylus through a rigid length of said stylus arm means providing a force-attenuating lever, and adapted through said lever to urge said stylus lightly against said surface of said record member, said stylus arm means being subjected to a static load torque of value $t$ developed at least partly by the friction drag of said surface and layer on said stylus and operable on said stylus arm means when said stylus is urged by said sensitive element to inscribe in said layer and restoring spring means opposing the torque of said sensitive element by a force increasing with increase in the angular deflection thereof, said spring means having a restoring coefficient which limits the length D of path traveled by said stylus in deflecting from zero to maximum torque position to a value such that the ratio $w/D$ approximates the ratio $t/T$.

2. A recording instrument comprising in combination, sensing means having an element which responds to a sensed physical quantity by angular deflection according to the value of said quantity, a needle tip stylus adapted to inscribe in a record sustaining layer a trace of the angular deflections of said element, a rigid stem arm attached by its shank to said element for linked angular deflection therewith, a rigid rocker arm carrying said stylus, and a torsion fiber attached to said stem arm at its head and to said rocker arm as a pivot therefor spaced from said stylus, said torsion fiber linking said arms by a coupling which is rigid and resilient, respectively, in the directions taken by and normal to said angular deflection, the torque of said torsion fiber and the spacing thereof from said stylus being mutually proportioned to exert at said stylus a resilient force having a value of 0.2 dyne at the most when said stylus is in inscribing position.

3. A recording instrument as in claim 2 wherein said stem arm is formed as a thin strip with the broad dimension thereof in the angular deflection direction and with a bifurcated head, the torsion fiber extends across the gap between the forks of said bifurcated head, and the rocker arm is formed as a thin strip pivoted within said gap by said torsion fiber at the gravity center of the weight supported by the fiber through the rocker arm.

4. Recording apparatus comprising in combination, a low energy sensitive element movable in angular deflection and generative of deflection torque from 0 dyne/cm. to 50 dyne/cm. at the most, said torque being generated in accordance with the value of a physical quantity sensed by said element and said torque having a value T at full scale deflection, a needle tip stylus adapted to inscribe in a record sustaining layer a trace of width $w$ of the angular deflections of said element, a rigid stem arm attached by its shank to said element for linked angular deflection therewith, a rigid rocker arm carrying said stylus, a torsion fiber attached to said stem arm at the head thereof and to said rocker arm as a pivot therefor spaced from said stylus, said torsion fiber linking said arms rigidly and resiliently, respectively, in the directions taken by and normal to the angular deflection of said element, the torque developed by said fiber during recording and the spacing of said fiber from said stylus being mutually proportioned to continuously exert at said stylus a resilient force having a value of 0.2 dyne at the most, when said stylus is in inscribing position, the linkage formed by said stem arm and rocker arm between said stylus and sensitive element being subjected to a static load torque of value $t$ when said stylus is urged by said sensitive element to inscribe in said layer, and restoring spring means opposing the torque of said sensitive element by a force increasing with increase in the angular deflection thereof, the spring means having a restoring coefficient which limits the length D of path traveled by said stylus in deflecting from zero to maximum torque position to a value such that the ratio $w/D$ approximates the ratio $t/T$.

5. Apparatus for recording a trace on a record member comprised of a dimensionally stable underbody and of a record sustaining layer in the form of a thin incohesive deposit of fine particles adhering loosely to said underbody, said apparatus comprising, record member support means for mounting said member with its layer side facing said support means by receiving in abutting relation a portion of said layer side while being in nonabutting relation with an inscribable area of said record sustaining layer on said layer side, said apparatus being constructed to permit closing movement of said member in a first direction towards and normal to said support means to bring said member into abutment with said support means, and said support means being constructed to render said inscribable area freely approachable from outwardly of said layer side in a second direction opposite to said first direction, a stylus arm disposed to the same side of said member when mounted as said support means, and extending transversely of said second direction to a free end disposed opposite said area, an inscribing stylus projecting in said second direction from said free end of said arm to contact said area of said member when mounted, resilient means adapted before mounting of said member to deflect said free end of said arm forwardly in said second direction in an amount positioning said stylus a distance beyond the position occupied by said area when said member is mounted, said stylus being backwardly deflected in said first direction through said distance to said position by contact with said member during said closing movement thereof, and said resilient means being responsive to said backward deflection of said stylus to generate a resilience force proportional to the distance of backward deflection and directed to maintain said stylus in pressure contact with said area, sensing means coupled to said stylus through said arm and responsive to a sensed physical quantity to move said stylus over said area according to the value of said quantity to thereby produce a trace in said layer by said stylus, and means to produce relative movement between said stylus and member in a direction transverse to the movement over said area imparted to said stylus by said sensing means.

References Cited in the file of this patent

UNITED STATES PATENTS

| | | |
|---|---|---|
| 338,596 | Huber | Mar. 23, 1886 |
| 748,918 | Bristol | Jan. 5, 1904 |
| 1,235,260 | Tubesing | July 31, 1917 |
| 1,699,788 | Greibach | Jan. 22, 1929 |
| 2,000,527 | Linderman | May 7, 1935 |
| 2,307,932 | Larson | Jan. 12, 1943 |
| 2,422,714 | Bigelow et al. | June 24, 1947 |
| 2,456,171 | Bernreuter | Dec. 14, 1948 |
| 2,584,149 | Moffitt et al. | Feb. 5, 1952 |

UNITED STATES PATENT OFFICE

CERTIFICATE OF CORRECTION

Patent No. 2,897,038                                         July 28, 1959

Bernard Vonnegut

It is hereby certified that error appears in the printed specification of the above numbered patent requiring correction and that the said Letters Patent should read as corrected below.

Column 12, line 43, for "generative or" read -- generative of --;

line 44, for "valve" read -- value --.

Signed and sealed this 29th day of December 1959.

(SEAL)
Attest:

KARL H. AXLINE                                                 ROBERT C. WATSON Attesting Officer                                             Commissioner of Patents